(12) United States Patent
Potnis et al.

(10) Patent No.: US 11,093,347 B2
(45) Date of Patent: Aug. 17, 2021

(54) FILE SYSTEM RESTORATION USING BLOCK-BASED SNAPSHOTS AND FILE SYSTEM CONSISTENCY CHECK

(71) Applicant: EMC IP Holding Company LLC, Hopkinton, MA (US)

(72) Inventors: Ajay Potnis, Pune (IN); Adnan Sahin, Needham, MA (US); Kiran B. Halwai, Pune (IN)

(73) Assignee: EMC IP Holding Company LLC, Hopkinton, MA (US)

(*) Notice: Subject to any disclaimer, the term of this patent is extended or adjusted under 35 U.S.C. 154(b) by 45 days.

(21) Appl. No.: 16/385,270

(22) Filed: Apr. 16, 2019

(65) Prior Publication Data

US 2020/0334111 A1 Oct. 22, 2020

(51) Int. Cl.
*G06F 11/14* (2006.01)
*G06F 16/11* (2019.01)

(52) U.S. Cl.
CPC ........ *G06F 11/1469* (2013.01); *G06F 16/128* (2019.01)

(58) Field of Classification Search
CPC ............. G06F 11/1446; G06F 11/1448; G06F 11/1471; G06F 16/128; G06F 11/1435
See application file for complete search history.

(56) References Cited

U.S. PATENT DOCUMENTS

| | | | |
|---|---|---|---|
| 7,689,599 B1* | 3/2010 | Shah | G06F 11/1471 714/19 |
| 7,870,356 B1* | 1/2011 | Veeraswamy | G06F 16/1744 711/162 |
| 7,949,637 B1 | 5/2011 | Burke | |
| 8,301,602 B1* | 10/2012 | Jiang | G06F 16/17 707/649 |
| 9,218,138 B1* | 12/2015 | Haase | G06F 3/0604 |
| 10,656,865 B1* | 5/2020 | Janse van Rensburg | G06F 3/064 |
| 2005/0182797 A1* | 8/2005 | Adkins | G06F 16/10 |

(Continued)

OTHER PUBLICATIONS

Yechiel Yochai, "Automated Information Life-Cycle Management With Thin Provisioning," U.S. Appl. No. 11/726,831, filed Mar. 23, 2007.

*Primary Examiner* — Joseph R Kudirka
*Assistant Examiner* — Kurosu Risa Altaf
(74) *Attorney, Agent, or Firm* — Muirhead and Saturnelli, LLC

(57) ABSTRACT

Techniques for performing a restoration may include: creating a first snapshot of a primary file system at a first point in time; and at a second point in time, performing first processing to restore at least a portion of the primary file system from the first point in time. The first processing may include: creating a second snapshot of the first snapshot of the primary file system; exporting the second snapshot as a first target device; mounting the first target device as a read-write checkpoint file system; performing file system consistency processing on the read-write checkpoint file system; and subsequent to performing the file system consistency processing on the read-write checkpoint file system, restoring at least a portion of the primary file system from the second snapshot using the read-write checkpoint file system. The file system consistency processing may include correcting metadata inconsistencies of the read-write checkpoint file system.

19 Claims, 11 Drawing Sheets

(56) References Cited

U.S. PATENT DOCUMENTS

| | | | | |
|---|---|---|---|---|
| 2011/0161295 A1* | 6/2011 | Ngo | .................... | G06F 11/1446 |
| | | | | 707/639 |
| 2012/0151136 A1* | 6/2012 | Hay | .................... | G06F 11/1469 |
| | | | | 711/114 |
| 2014/0325267 A1* | 10/2014 | Liu | .................... | G06F 11/1469 |
| | | | | 714/15 |
| 2016/0011946 A1* | 1/2016 | Simon | ................. | G06F 11/1464 |
| | | | | 714/19 |
| 2016/0321339 A1* | 11/2016 | Tekade | ..................... | G06F 8/76 |
| 2018/0300205 A1* | 10/2018 | Sehgal | ................ | G06F 11/1453 |

* cited by examiner

FILE SYSTEM RESTORATION USING BLOCK-BASED SNAPSHOTS AND FILE SYSTEM CONSISTENCY CHECK

BACKGROUND

Technical Field

This application generally relates to data storage and more particularly to techniques for restoring a file system.

Description of Related Art

Data storage systems may include resources used by one or more host systems. Data storage systems and host systems may be interconnected by one or more communication connections such as in a network. These resources may include, for example, data storage devices such as those included in the data storage systems. These data storage systems may be coupled to one or more host systems where the data storage systems provide storage services to each host system. Multiple data storage systems from one or more different vendors may be connected and may provide data storage services for one or more host systems.

A host may perform a variety of data processing tasks and operations. For example, an application may executed on the host and the application may issue I/O (input/output) operations, such as data read and write operations, sent to the data storage system.

Host systems may store data to and/or retrieve data from a storage device included in a data storage system containing a plurality of host interface units, physical storage devices or drives, and physical storage interface units. The storage device may be a logical storage device. The host systems access the storage device through a plurality of channels provided therewith. Host systems may perform read and write operations through the channels to the data storage system and the data storage system provides the data to the host systems also through the channels. The host systems do not address the physical storage devices or drives of the data storage system directly, but rather, access what appears to the host systems as a plurality of logical storage devices or units (which may or may not correspond to the actual physical storage devices or drives). Allowing multiple host systems to access a single storage device allows the host systems to share data of the storage device. In order to facilitate sharing of the data on the storage device, additional software on the data storage systems may also be used.

SUMMARY OF THE INVENTION

Embodiments of the techniques herein include a method, computer readable medium and system for performing a file system restoration. A first snapshot of a primary file system is created at a first point in time. At a second point in time subsequent to the first point in time, first processing is performed to restore at least a portion of the primary file system from the first point in time. The first processing includes: creating a second snapshot of the first snapshot of the primary file system at the first point in time; exporting the second snapshot as a first target device; mounting the first target device as a read-write checkpoint file system that denotes a logical version of the primary file system at the first point in time; performing file system consistency processing on the read-write checkpoint file system corresponding to the second snapshot of the first snapshot of the primary file system; and subsequent to performing the file system consistency processing on the read-write checkpoint file system, restoring at least a portion of the primary file system from the second snapshot using the read-write checkpoint file system. The primary file system may be created on a first logical device used within a block server, the first logical device may be exported as a second target device, and the second target device may be mounted as the primary file system on a file server. Creating the first snapshot of the primary file system may include creating a first block-based snapshot of the first logical device on a block server. The second snapshot may be a second block-based snapshot, and creating the second snapshot of the primary file system may include: creating the second block-based snapshot of the first block-based snapshot of the first logical device on the block server; and exporting the second block-based snapshot as the first target device. Performing file system consistency processing may include modifying metadata of the second snapshot to correct a detected metadata inconsistency. Restoring at least a portion of the primary file system may include copying any of a file and a directory from the primary file system as at the first point in time from the read-write checkpoint file system to the primary file system. Restoring at least a portion of the primary file system may include restoring, from the read-write checkpoint file system, the primary file system to a version corresponding to the first point in time. Restoring the primary file system may be performed as a background operation while servicing file-based commands and operations directed to the primary file system. The first processing performed at a second point in time subsequent to the first point in time to restore at least a portion of the primary file system from the first point in time may be performed responsive to determining that at least a portion of the primary file system at the second point in time has been any of corrupted, compromised, deleted or modified. Mounting the first target device as a read-write checkpoint file system may include replaying and applying to the read-write checkpoint file system any incomplete subtransactions of pending transactions in a transaction log for the read-write checkpoint file system. The file system consistency processing may include correcting any metadata inconsistencies of the read-write checkpoint file system.

BRIEF DESCRIPTION OF THE DRAWINGS

Features and advantages of the techniques herein will become more apparent from the following detailed description of exemplary embodiments thereof taken in conjunction with the accompanying drawings in which.

DETAILED DESCRIPTION OF EMBODIMENT(S)

Figure 1:
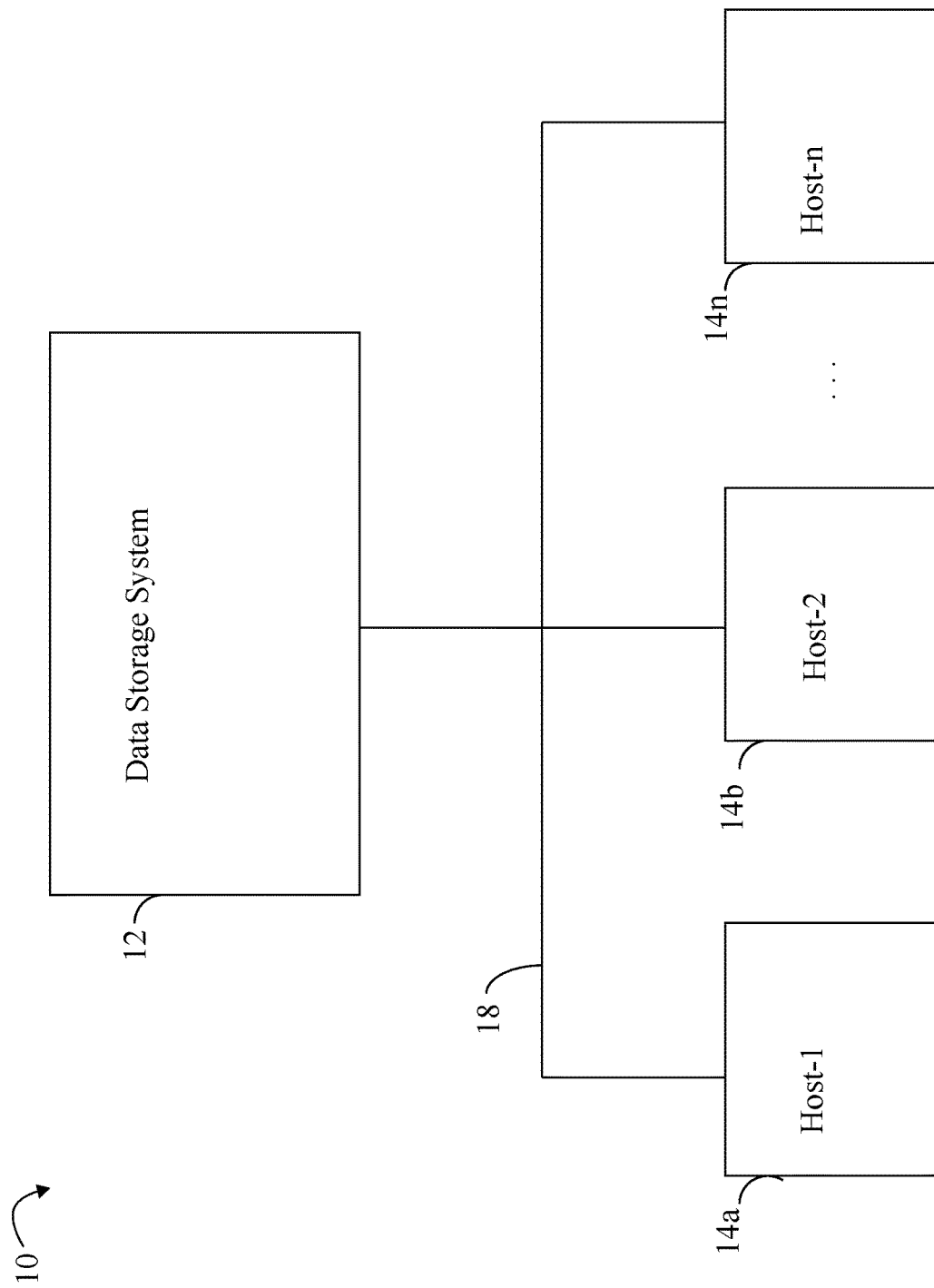
FIG. 1 is an example of an embodiment of a system that may utilize the techniques described herein.

Referring to FIG. 1, shown is an example of an embodiment of a system that may be used in performing the techniques described herein. The system 10 includes a data storage system 12, such as a data storage array, connected to the host systems 14a-14n through the communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connection known in the art. For example, the communication medium 18 may be an intranet, network or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and the data storage system may all be located at the same physical site, or, alternatively, may also be located in different physical locations. The communication medium that may be used to provide the different types of connections between the host computer systems and the data storage system of the system 10 may use a variety of different block-based and/or file-based communication protocols such as TCP/IP, SCSI (Small Computer Systems Interface), Fibre Channel, iSCSI, Fibre Channel over Ethernet, NVMe (Non-Volatile Memory Express) over Fabrics, Network File System (NFS), and the like. Some or all of the connections by which the hosts and the data storage system 12 may be connected to the communication medium 18 may pass through other communication devices, switching equipment that may exist such as a phone line, a repeater, a multiplexer or even a satellite.

Each of the host computer systems may perform different types of data operations. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12. It should be noted that the data storage system 12 of FIG. 1 may physically be a single data storage system, as well one or more other data storage systems as may vary with the embodiment.

Figure 2A:
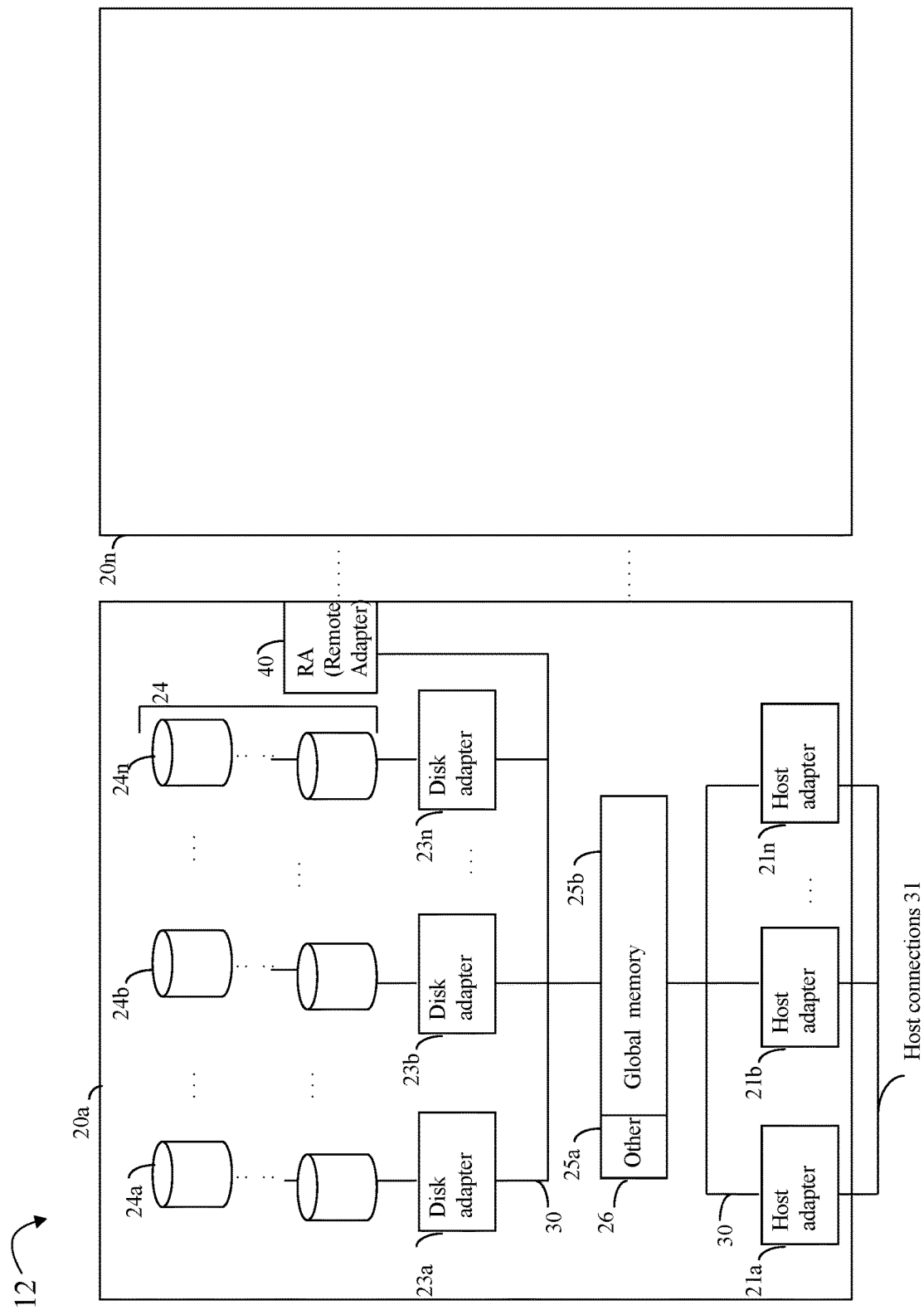
FIG. 2A is an example of an embodiment of a data storage system.

Referring to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be interconnected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of the data storage systems 20a-20n may be resources included in an embodiment of the system 10 of FIG. 1 to provide storage services to, for example, the host computer systems. It should be noted that the data storage system 12 may operate stand-alone, or may also be included as part of a storage area network (SAN) that includes other components.

Each of the data storage systems, such as 20a, may include a plurality of disk devices or volumes, such as the arrangement 24 consisting of n rows of disks or more generally, data storage devices, 24a-24n. In this arrangement, each row of the disks may be connected to a disk adapter ("DA") or director responsible for the backend management of operations to and from a portion of the disks 24. In the system 20a, a single DA, such as 23a, may be responsible for the management of a row of disks, such as row 24a. In a data storage system, a backend DA may also be referred to as a disk controller. The DA may perform operations such as reading data from, and writing data to, the physical devices which are serviced by the DA.

It should be noted that, more generally, the physical devices or data storage devices 24a-24n may be any suitable type of physical storage device or media, such as any form of a suitable back-end non-volatile storage device. For example, physical devices included in an embodiment of a data storage system may include one or more types of rotating disk drives (e.g., SATA, SAS, FC 15K RPM, FC 10K RPM), one or more types of flash-based storage devices, or more generally solid state drives (SSDs), and the like.

Also shown in the storage system 20a is an RA or remote adapter 40. The RA may be hardware including a processor used to facilitate communication between the data storage systems, such as between two of the same or different types of data storage systems.

The system 20a may also include one or more host adapters ("HAs") or directors 21a-21n. Each of these HAs may be used to manage the communications and data operations between one or more host systems and the global memory. In an embodiment, the HA may be a Fibre Channel Adapter (FA) or other adapter which facilitates host communication. Generally, the directors may also be characterized as the different adapters, such as the HAs (including FAs), DAs, RAs and the like, as described herein. Components of the data storage system, such as an HA, which may communicate with a host (e.g., receive the host I/O commands and send the responses to the host) may also be referred to as front end components. A DA is an example of a backend component of the data storage system which may communicate with a front end component. In connection with the data storage systems, various types of directors or adapters may be implemented as a processor, or, more generally, a component that includes the processor. Examples of directors are DAs, HAs, RAs, and the like, such as described herein.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other the disk adapters or directors, and other components of the system 20a. The other portion 25a is that portion of the memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

The host systems provide data and access control information through channels to the storage systems, and the storage systems may also provide data to the host systems also through the channels. The host systems do not address the disk drives of the storage systems directly, but rather access to the data may be provided to one or more host systems from what the host systems view as a plurality of logical devices or logical units. A logical unit (LUN) may be characterized as a disk array or a data storage system reference to an amount of disk space that has been formatted and allocated for use by one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives. For example, the one or more LUNs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and the LUN(s) residing thereon.

The DA physically accesses the back-end non-volatile storage devices, such as the physical data storage devices (PDs) denoted by 24 of FIG. 2A. Data residing on a PD may be accessed by the DA following a data request in connection with I/O operations that other directors originate. In at least one embodiment, write data received at the data storage system from a host or other client may be initially written to a cache memory (e.g., such as may be included in the component designated as 25b) and marked as write pending. Once written to the cache, the host may be notified that the write operation has completed. At a later point time, the write data may be destaged from the cache to the physical storage device, such as the non-volatile physical storage device (PDs of 24) accessed by a DA. In connection with reads, processing may include first looking to see if the requested read data is in the cache whereby a read hit occurs. For a read hit, the read is serviced using the cached copy of the requested read data by returned the cached read data to the requester. Thus, with a read hit, there is no need to access the physical (back end) non-volatile storage by the DA to obtain the requested read data thereby resulting in a faster read I/O response time. If the requested read data is not in the cache, the requested read data is obtained from the physical (back end) non-volatile storage by the DA where the read data is then stored in the cache, and returned to the requester. The cached copy of the read data may then be available to further service any other subsequent reads. As known in the art, any suitable cache management technique may be used to maintain the cache, for example, such as in determining how long data remains in the cache, whether to prefetch data, selecting data stored in the cache for eviction, and the like.

Figure 2B:
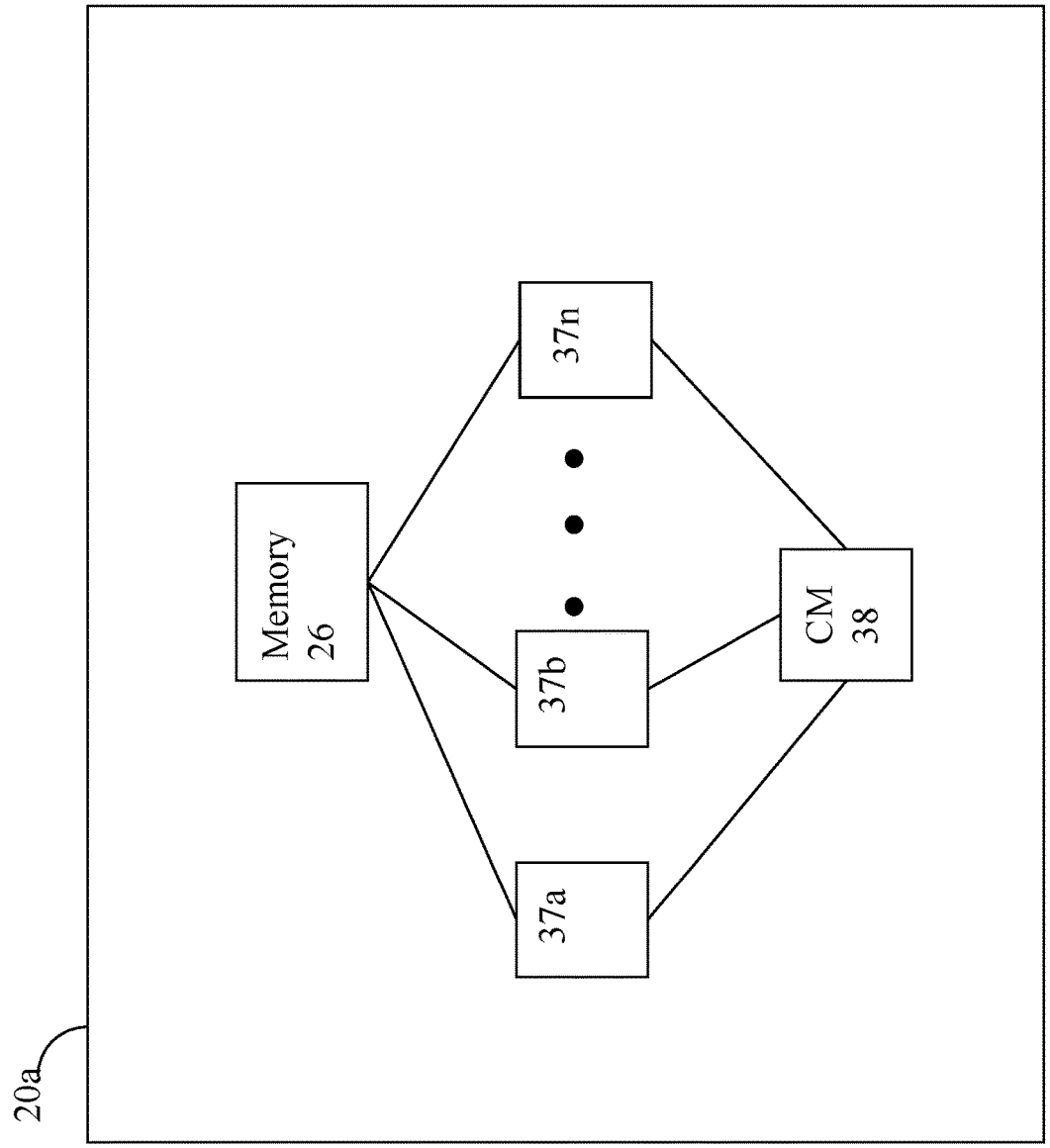
FIG. 2B is a representation of the logical internal communications between the directors and memory included in one embodiment of the data storage system of FIG. 2A.

Referring to FIG. 2B, shown is a representation of the logical internal communications between the directors and the memory included in a data storage system. Included in FIG. 2B is a plurality of directors 37a-37n coupled to the memory 26. Each of the directors 37a-37n represents one of the HAs, RAs, or DAs that may be included in a data storage system. Each of the directors may be, for example, a processor or a printed circuit board that includes a processor and other hardware components. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

A host may be able to access data, such as stored on a LUN of a data storage system, using one or more different paths from the host to the data storage system. A data storage system device, such as a LUN, may be accessible over multiple paths between the host and data storage system. Thus, a host may select one of possibly multiple paths over which to access data of a storage device.

It should be noted that the particular exemplary architecture of a data storage system such as, for example, in FIGS. 2A and 2B is merely illustrative of one such architecture that may be used in connection with the techniques herein. Those skilled in the art will appreciate that the techniques herein may be used with any suitable data storage system. For example, FIG. 2B provides an example of components that may be included in a separate physical fabric used for control communications sent between components of the data storage system. Some embodiments may use separate physical fabrics for each of data movement and control communications between data storage system components. Alternatively, some embodiments may use a same shared physical fabric for both data movement and control communication functionality rather than have a separate control communications fabric such as illustrated in FIG. 2B.

In an embodiment of a data storage system in accordance with the techniques herein, the components such as HAs, DAs, and the like may be implemented using one or more "cores" or processors each having their own memory used for communication between the different front end and back end components rather than utilize a global memory accessible to all storage processors.

It should be noted that although examples of the techniques herein may be made with respect to a physical data storage system and its physical components (e.g., physical hardware for each HA, DA, HA port and the like), techniques herein may be performed in a physical data storage system including one or more emulated or virtualized components (e.g., emulated or virtualized ports, emulated or virtualized DAs or HAs), and also a virtualized or emulated data storage system including virtualized or emulated components.

The data storage system may provide various data services. For example, in at least one embodiment in accordance with the techniques herein, a data storage system may provide different data replication technologies, facilities or services. Such replication technologies may be characterized as local or remote. Additionally, a replication technology may provide for creating a complete, physical bit for bit copy or replica of data (that is local and/or remote). A replication technology may provide for creating a logical or virtual point in time copy of a data source such as using a snapshot technology or facility known in the art. As described elsewhere herein, such logical copies of a data source are not a complete physical copy of the data source. Rather, different techniques such as a snapshot technique may be used to create a logical or virtual copy of the data source. For example, a snapshot facility may be used in an embodiment in accordance with techniques herein to create a snapshot characterized as a logical point in time copy of data. In connection with a logical device, or more generally any storage entity, software of a data storage system may provide one or more data replication services or facilities whereby a snapshot is one such facility that may be used to create point in time snapshot of a logical device such as a LUN for non-disruptive backup. A snapshot may appear like a normal logical device and may be used for backup, testing, and the like. Snapshots may rely, for example, on copy on first write (COFW) and other techniques to track source logical device changes from the time when a snapshot was created. Any writes to the source logical device may result in processing by snapshot software, for example, to copy the original data prior to changes into another area of storage before overwriting the source logical device location with the newly written data (e.g., original data is copied/written to a new location). With respect to COFW techniques, the COFW occurs only once for each data block modified on the source device. Since only changed data blocks of the source device are retained rather than make a complete copy of the source device, the storage capacity required to implement snapshots may be considerably less than that of the source device. Though a snapshot of a source logical device may be presented to a user as a separate logical device along with the current source logical device, a snapshot of the source logical device is a virtual point in time copy and requires access to the unchanged data in the source logical device. Therefore failures affecting the source logical device also affect the snapshot of the source logical device. Snapshots of a source logical device may be contrasted, for example, with the physically complete bit-for-bit replicas of the source logical device.

In connection with the foregoing, COFW is only one example of a technology or a technique that may be used in connection with snapshots. More generally, any suitable technique may be used in connection with snapshot creation and techniques described herein. As another example, redirect on Write (ROW) is another technique that may be used in connection with a snapshot implementation. With ROW, after a snapshot is taken, new writes to the primary or logical device are redirected (written) to a new location.

In at least one embodiment in accordance with techniques herein, the snapshot facility may be TimeFinder® SnapVX™ by Dell Inc. using the ROW techniques as noted above. With ROW in at least one embodiment, when a source volume or logical device is written to and the original data of the source volume or logical device needs to be preserved for a snapshot(s), the new write is accepted and asynchronously written to a new location. The source volume now points to the new data while the snapshot(s) continue to point to the original data (e.g., the snapshot delta) in its original location.

A data storage system may provide support for one or more types of logical devices or LUNs. The techniques herein may be used in an embodiment having thin or virtually provisioned logical devices. A thin logical device or LUN is a type of logical device where units of storage are progressively allocated on an as-needed basis. Typically, the base units of storage are provisioned from multiple sets of PDs organized as RAID groups, where these groups are partitioned into small portions sometimes referred to as slices. There is a mapping provided to relate the logical address in a thin device to the particular slice of provisioned storage. In a system using thin provisioning, the thin devices may appear to a host coupled to a data storage array as one or more logical volumes (logical devices) containing contiguous blocks of data storage. A thin device may be virtually provisioned in terms of its allocated physical storage where physical storage for a thin device (presented to a host as having a particular capacity) is allocated as needed rather than allocate physical storage for the entire thin device capacity upon creation of the thin device. As such, a thin device presented to the host as having a capacity with a corresponding LBA (logical block address) range may have portions of the LBA range for which storage is not allocated. In some embodiments, storage associated with a particular subrange of the logical address space of a thin device (where the subrange may be the size of a slice or chunk allocation unit) may be initially allocated in response to the first time there is write to the logical address subrange. Thin devices and thin provisioning are described in more detail in U.S. patent application Ser. No. 11/726,831, filed Mar. 23, 2007 (U.S. Patent App. Pub. No. 2009/0070541 A1), AUTOMATED INFORMATION LIFE-CYCLE MANAGEMENT WITH THIN PROVISIONING, Yochai, EMS-147US, and U.S. Pat. No. 7,949,637, Issued May 24, 2011, Storage Management for Fine Grained Tiered Storage with Thin Provisioning, to Burke, both of which are incorporated by reference herein.

An embodiment in accordance with techniques herein may provide for logical devices that are thin or virtually provisioned devices along with thick logical devices. A thick device or LUN may be characterized as a regular logical device presented as having a particular storage capacity where physical storage is provisioned (allocated or bound) for the entire storage capacity when the thick device is configured.

In at least one embodiment in accordance with the techniques herein, a point-in-time snapshot can be accessed by linking it to a host accessible logical device sometimes referred to as a target logical device or volume. The foregoing relationship or connection between a snapshot and a target logical device may be established using a command such as a link or bind command. In such an embodiment, the snapshot may be linked (e.g., via execution of a bind or a link command) to a target logical device or LUN that is further exposed or made available to a file server, the host, or other data storage system client where the target logical device or LUN is also a thin LUN (TLU). In such an embodiment, the relationship between a snapshot and a linked target device may be broken using a command such as unbind or unlink. In following paragraphs, the techniques herein may use a TLU in examples. However, more generally, any suitable LUN or logical device may be used. Furthermore, in connection with a linked target device such as a TLU, the target device may be further mounted as a file system by a file server as discussed in more detail elsewhere herein. In at least one embodiment, each file system or snapshot of a file system may have its own corresponding block-based storage entity, such as a TLU, from which storage is provisioned. For a particular file system or snapshot of a file system, its information including metadata and transaction log data may be stored on the corresponding TLU. When taking a snapshot of a file system, the snapshot is taken of the file system with respect to its data, metadata and transaction log. Thus, the snapshot of a file system has its own associated transaction log denoting the state of the transaction log of the file system when the snapshot of the file system is taken.

In following paragraphs, described are novel techniques for restoring a file system as may be needed in cases of data corruption and/or modification. For example, the techniques described in the following paragraphs may be used to restore a file system when data of the file system is mistakenly deleted, when data and/or metadata of the file system is corrupted, when the file system is compromised such as due to malicious code, virus contamination, hacking, and the like. The techniques in following paragraphs provide for retrieving the original uncorrupted or unmodified data from a logical point in time copy or check point version of the file system such as from a snapshot of the file system.

In at least one embodiment, one or more block-based snapshots may be taken of the logical device or LUN from which the file system has its storage provisioned. For example, such snapshots may be taken on-demand and/or in accordance with a defined schedule. Consistent with discussion herein, block-based snapshots of the LUN (e.g., from which the file system has its storage provisioned) may be characterized as logical point in time versions of the LUN (e.g., upon which the file system may be created and has its storage provisioned). Upon occurrence of an event that compromises, deletes, or otherwise modifies the file system thereby requiring restoration to a prior version of the file system, processing may be performed to select one of the previously taken snapshots of the file system having a corresponding block-based snapshot of the LUN providing storage for the file system. In this case, the file system is to be restored to the particular logical point in time version denoted by the corresponding block-based snapshot of the LUN selected.

As described in more detail in following paragraphs, processing in an embodiment in accordance with techniques herein may take a second snapshot of the corresponding block-based snapshot of the LUN of the file system. The second block-based snapshot may be a read/write (R/W) snapshot that is exported as another second LUN that is then mounted as a R/W checkpoint file system. The mounted R/W checkpoint file system is a R/W snapshot of the file system at the particular logical point in time version desired for restoration. Such processing may also include performing a file system consistency check on the R/W checkpoint file system (e.g., R/W snapshot of the file system) using a tool, utility or application, such as FSCK, that performs file system consistency checking and/or repairing. A tool or utility such as FSCK may be used to ensure the restored file system is consistent in terms of data and associated metadata. As known in the art, FSCK (file system consistency check) is a system utility for checking the consistency of a file system in Unix and Unix-like operating systems, such as a Linux® operating system, and a FreeBSD® operating system. As noted above, the mounted checkpoint file system is R/W (rather than read only (RO)) and can be modified as needed by FSCK. In connection with the techniques herein, the FSCK utility or other utility or application performing the file system consistency checking of the R/W mounted checkpoint file system may perform any needed modifications in order to remove any detected file system inconsistencies and leave the R/W mounted checkpoint file system in a consistent state whereby the data, log transaction, and associated metadata are consistent. Once the R/W mounted checkpoint file system is in a consistent state, a restoration operation may be performed that restores the file system from the R/W mounted checkpoint file system. In this manner, the file system (that is the primary file system) may be restored to the particular point in time version denoted by the R/W mounted checkpoint file system that is in a consistent state (e.g., whereby the data and associated metadata of the file system are consistent).

Figure 3:
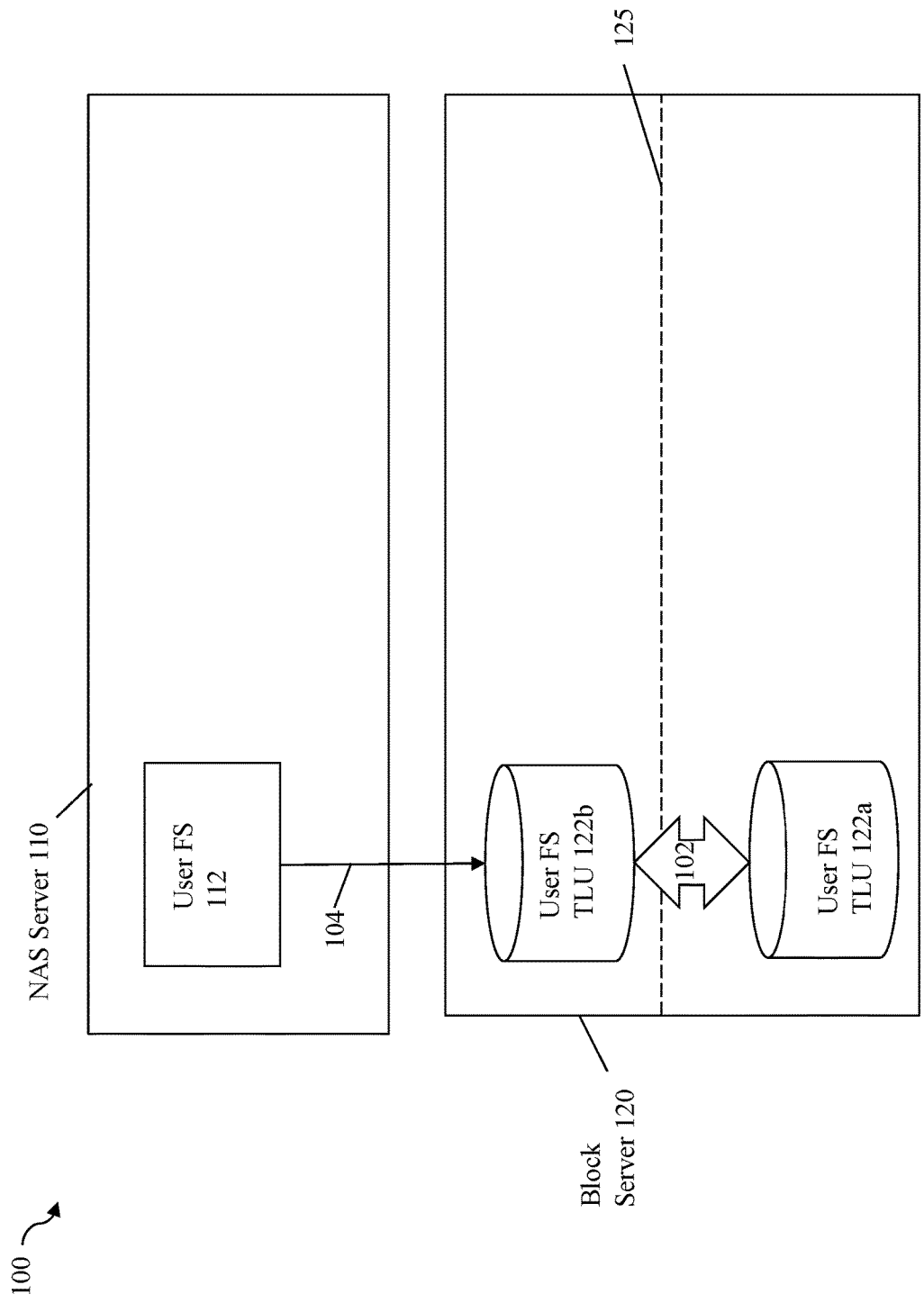
FIGS. 3, 4, 5, 6, 7 and 8 are examples illustrating components and processing that may be performed in an embodiment in accordance with the techniques herein.

Referring to FIG. 3, shown is an example of components that may be included a data storage system at a first point in time in an embodiment in accordance with the techniques herein. The example 100 includes the NAS (Network-attached storage) server 110 and the block server 120. The NAS server 110 is one example of a file-level computer data storage server that may be used with the techniques herein. More generally, an embodiment may be used in connection with any suitable file server. The block server 110 may be characterized as a block-based data storage server providing block level storage services. In at least one embodiment, the NAS server 110 may be implemented as software executing on a processor of a director (e.g, FA or other front end adapter) of the data storage system. In at least one embodiment, the block server 110 may also be implemented as software executing on a processor of a director where the director may be a hardware-based component. In at least one embodiment, the NAS server and/or block server may be software executing in an emulated version of a director, such as an FA. In this latter embodiment, the director such as the FA may be emulated or implemented as software executing on a processor rather than as a director that is a hardware-based component.

Consistent with other discussion herein, the NAS server 110 may receive file-based commands and I/O requests over a network from one or more clients, such as hosts having applications executing thereon. The NAS server 110 may include the user file system (FS) 112. The block server 120 may include block-based storage LUNs, such as thin LUNs (TLUs) providing the backing storage for file systems, such as user FS 112, of the NAS server 110. The line 125 within the block server 120 denotes a logical partitioning of storage objects or entities in the block server. The storage objects or entities in the block server 120 that are below the line 125 denote identities of the storage objects as used internally in the block server 120. Elements above the line 125 denote identities of the storage objects as exposed or exported from block server 120 to the NAS server 110, and thus to hosts or other clients of the NAS server 110. In this example 100, each storage object below the line 125 has a corresponding storage object above the line 125 whereby the storage object below line 125 may be exported or exposed externally for use by the NAS server 110 (and thus hosts or clients of the NAS server) as its corresponding storage object above the line 125. However, both the storage object below line 125 and its corresponding storage object above line 125 refer to the same storage entity on the block server 120 having an internal identity (e.g., below line 125) and a corresponding external, exposed or exported identity (e.g., above line 125). For example, the user FS TLU 122a may denote the TLU from which storage is provisioned for the user FS 112.

It should be noted that generally the block server 120 may have more storage entities below line 125 that are not exported or exposed and therefore do not have a corresponding identity above line 125. For example, as described in more detail herein, storage entities such as TLUs and snapshots of TLUs may be created within block server 120a and thus have a corresponding internal identity below line 125. However, not all such storage entities may be exposed or exported outside of the block server 120. For example, as discussed herein, a snapshot of a TLU may be exposed or exported via a link command as a target device, such as a TLU. The target device TLU (e.g., that is linked to a block-based TLU or a snapshot of such a TLU) as exported by the block server 120 may then be further mounted by a host or client through the file server, such as NAS server 110. However, it may be that additional block-based snapshots of TLUs or other LUNs are created within the block server 120 but such snapshots may not be exposed or exported, such as via a link command, outside of the block server 120. Such snapshots not exposed or exported outside the block server 120 may not have a corresponding external identity above line 125.

Within the block server, the user FS TLU 122a may be included in a storage group of one or more logical devices having a desired service level objective (SLO). The SLO of the storage group, or more generally, a logical device, may generally denote target performance goals or properties in line with a selected level of service provided by the data storage system in connection with servicing I/Os and application data stored in the storage group or logical device. For example, an embodiment may have multiple defined service levels or SLOs, such as DIAMOND (highest performance), GOLD (middle performance), and BRONZE (lowest performance). For each SLO, different performance targets or goals may be specified that may affect, for example, the particular physical storage media upon which data of the storage group or LUN is stored, resources allocated for use in servicing I/Os directed to a particular logical device or storage group, priority in servicing I/Os directed to a particular logical device or storage group (relative to other logical devices and storage groups having a lower or higher SLO), and the like. In at least one embodiment, the default SLO for a TLU of the block server 120 may be DIAMOND.

The user FS TLU 122a may be exposed or exported 102 (e.g., such as by execution of the link command described herein) from the block server 120 to the NAS server 110 as the user FS TLU 122b. The NAS server 110 may mount the TLU 122b as the user FS 112. Clients, such as hosts, may issue file-based commands to the NAS server 110 where such commands are directed to the user FS 112. For example, the file-based commands issued to the NAS server 110 may include commands to write data to a file, create a file, create a directory, delete a file, delete a directory, read data from a file, delete specified portions of a file, and the like. The arrow 104 denotes that the user FS 112 is created and has its storage provisioned from the user FS TLU 122b of the block server 120. The arrow 104 denotes that the FS TLU 122b is mounted as a file system, user FS 112 (which is R/W). Subsequent to mounting user FS 112, the file system user FS 112 may be exported and made available to a host or other client (having the correct authentication) through the NAS server 110.

In at least one embodiment, one or more block-based snapshots of the user FS TLU 122a may be created. As noted herein, the one or more block-based snapshots may be created using any suitable technique such as on-demand (e.g., when requested by a user request), based on a defined schedule, such as defined local replication schedule, and the like. In at least one embodiment, a schedule may be specified to take a block-based snapshot of the user FS TLU 122a at predefined times, such as every day, at particular times each day, and the like. In at least one embodiment, a command may be issued, such as through a file system layer of the NAS server 110, to create a snapshot on demand of the user FS 112. Such a command may result in generating a request from the NAS server 110 to the block server 120 to create a block-based snapshot of TLU 122a. For simplicity of illustration of techniques herein, assume subsequent to the first point in time as illustrated in FIG. 3 processing is performed to create a single block-based snapshot of user FS TLU 122a.

Figure 4:
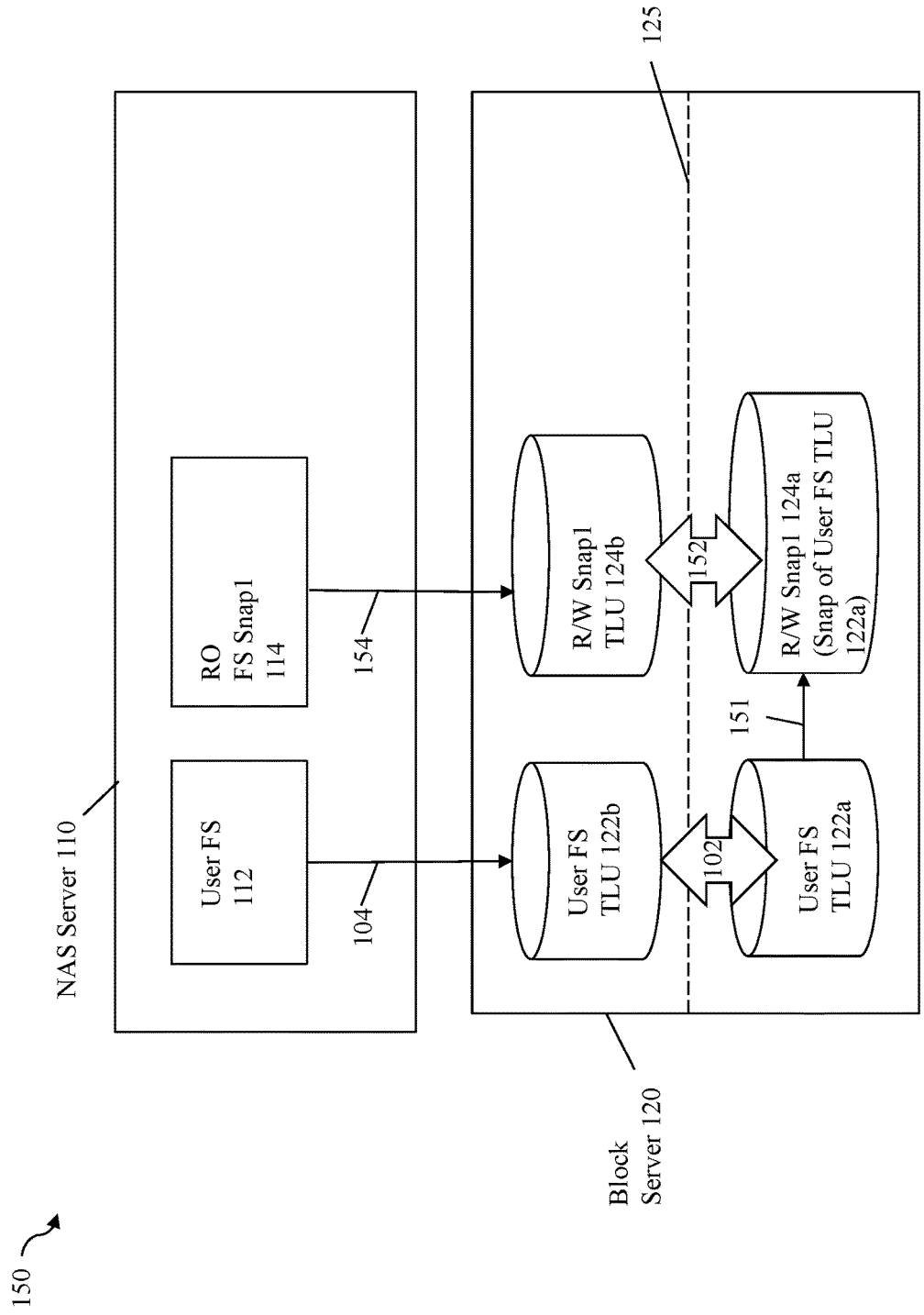

Referring to FIG. 4, shown is an example of components of a data storage system that may be used in connection with techniques herein at a second point in time. The example 150 may denote the state of the data storage system and its components at the second point in time subsequent to that as illustrated in FIG. 3 and after the single block-based snapshot (124a) of the user FS TLU 122a is created. In the example 150, the snapshot (snap) of the user FS TLU 122a is denoted as R/W Snap1 124a (e.g., 124a denotes a R/W snap of TLU 122a). A snapshot as described herein may also be referred to as a checkpoint having an associated date/time of when the snapshot is created. As such, the R/W Snap1 124a is a logical point in time view of the user FS TLU 122a at the point in time at which the snap 124a is created. The R/W Snap1 124a is exported 152 to the NAS server 110 as a TLU, R/W snap1 TLU 124b. The R/W snap1 TLU 124b may be mounted 154 as the checkpoint file system, RO FS Snap1 114, denoting a read only (RO) file system. Thus, 114 is a RO file system that is a logical point in time version of the user FS 112 as captured in the snapshot 124a. The arrow 152 may denote the creation of the snapshot 124a of the TLU 122a where snapshot 124a may be created, for example, on-demand or based on a schedule.

In at least one embodiment, performing a mount command may trigger mount processing to be performed. For example, the mount 154 of the R/W snap1 TLU 124b by the NAS server 110 as the RO FS Snap1 114 may trigger the mount processing. The mount processing performed responsive to the mount command in connection with 154 may include replaying of the log for the R/W snap1 124a where there is a check for, and completion of, any pending subtransactions (as denoted by steps of a transaction recorded in a log but which have not yet been completed as denoted in the log). Such pending subtransactions are completed and applied to the RO FS Snap1 114.

In connection with user FS 112, RO FS Snap1 114, as well as other file systems described herein, as known in the art, a file system may have associated file system data, file system metadata and a file system transaction log. The file system data may include the user data such as written by clients and stored in files of the file system. The file system metadata may generally include metadata or information about the file system. The file system transaction log or journal is a log in which writes or modifications made to the file system are recorded. The file system may utilize the concept of a transaction that may include multiple subtransactions or writes. Thus, a single transaction may include performing multiple writes to one or more storage objects of the file system. To maintain write consistency and transaction level atomicity, mount processing in connection with mounting (154) RO FS Snap1 114 may include replaying the log for the RO FS Snap1 114 (and thus log for 124a). The replaying of the log for the RO FS Snap1 114 includes checking for, and completion of, any pending subtransactions (as denoted by steps of a transaction recorded in a log but which have not yet been completed as denoted in the log). Such pending subtransactions are completed and applied to the snapshot RO FS Snap1 114 (e.g., applied to R/W Snap1 124a). Such mount processing may be performed and applied to R/W Snap1 124a to ensure that RO FS Snap1 114 is in a write consistent state prior to completing the mount of the RO FS Snap1 114 that is available for I/O processing.

It should be noted that the first snapshot 114 of the user FS is illustrated in FIG. 4 as a RO snapshot. More generally, the first snapshot 114 may have other associated accesses such as R/W rather than RO. In a similar manner, although the internal snapshots (e.g., below line 125) created for use within the block server 120 are denoted as R/W snapshots, in an embodiment in accordance with techniques herein, the snap 124a may alternatively be RO rather than R/W.

Subsequent to mounting RO FS Snap1 114, the checkpoint file system RO FS Snap1 114 may be exported and made available to a host or other client (having the correct authentication) through the NAS server 110.

While the snapshot RO FS Snap1 114 and the user FS 112 are mounted, an event occurs as described herein resulting in data corruption or deletion within the user FS 112. For example, a user may delete critical data from the user FS 112. In any case, the event occurrence results in the user FS 112 being in a state where it is necessary to restore data from a prior version of user FS 112, such as from a prior point in time snapshot of user FS. In this example, assume it is necessary to restore the user FS 112 to the prior version as denoted by the snapshot of user FS 112, or more specifically, restore the user FS 112 to the point in time version of block-based snapshot 124a. Processing continues now as described below with reference to FIG. 5 at a third point in time subsequent to that as illustrated in FIG. 4.

Figure 5:
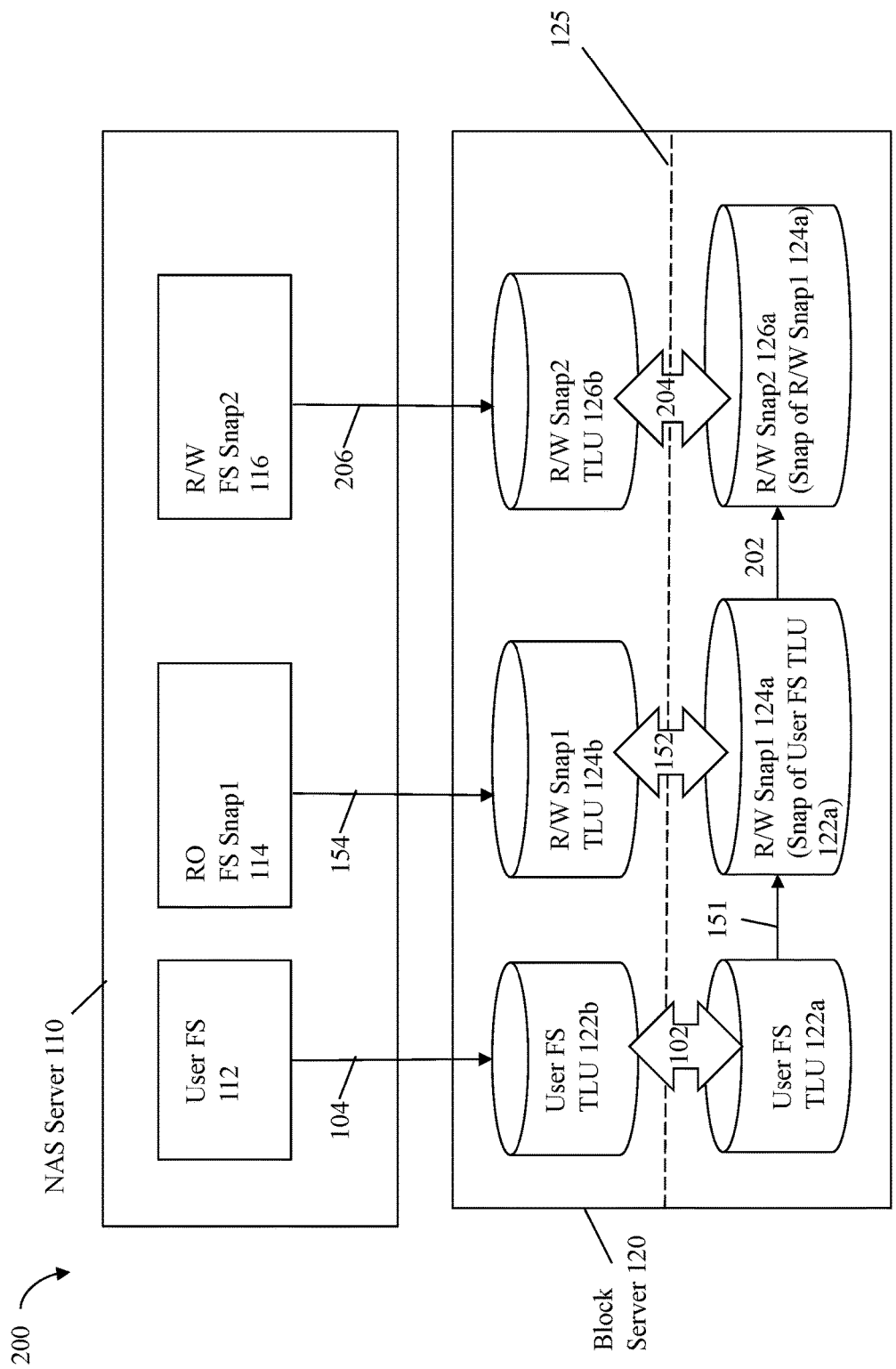

With reference to FIG. 5, processing may be performed to create R/W FS Snap2 116 that is a new R/W snap from the RO FS Snap1 114. Such processing may include having the block server 120 create 202 a new R/W snapshot 126a of the existing LUN snapshot, R/W Snap1 124a. In particular, the block server 120 creates 202 the new snapshot 126a of R/W Snap1 124a where the new snapshot created is denoted in FIG. 5 as R/W Snap2 126a. The new snapshot, R/W Snap2 126a, is exported or exposed 204 as a TLU, denoted as R/W Snap2 TLU 126b. The TLU 126b may then be mounted 206 via the NAS sever as a checkpoint R/W file system or logical point in time R/W file system, denoted as R/W FS Snap2 116 in the NAS Server of FIG. 5. To maintain write consistency and transaction level atomicity, the mount processing in connection with mounting (206) R/W FS Snap2 116 may include replaying the log for the R/W FS Snap2 116 (and thus 126a). The replaying of the log for the R/W FS Snap2 116 includes checking for, and completion of, any pending subtransactions (as denoted by steps of a transaction recorded in a log for 116/126a but which have not yet been completed as denoted in the log). Such pending subtransactions are completed and applied to the snapshot R/W FS Snap2 116 (e.g., applied to R/W Snap2 126a). Such mount processing may be performed and applied to R/W Snap2 126a to ensure that R/W FS Snap2 116 is in a write consistent state in accordance with the transaction log (of R/W Snap2 126a/116) prior to completing the mount of the R/W FS Snap2 116 that is available for I/O processing.

After completing the mount processing 206 where the R/W FS snap2 116 has been mounted as another second checkpoint file system 116, the file system consistency check tool or utility, such as FSCK, is then run on the newly created and mounted R/W file system, R/W FS snap2 116 of FIG. 5. In at least one embodiment, the file system consistency check tool such as FSCK may correct any metadata inconsistencies detected with respect to data and metadata of the mounted checkpoint file system R/W FS snap2 116. Such correction of inconsistencies may include modifying (e.g., deleting and/or updating) metadata of the mounted checkpoint file system, R/W FS snap2 116 to place it in a consistent state.

Figure 6:
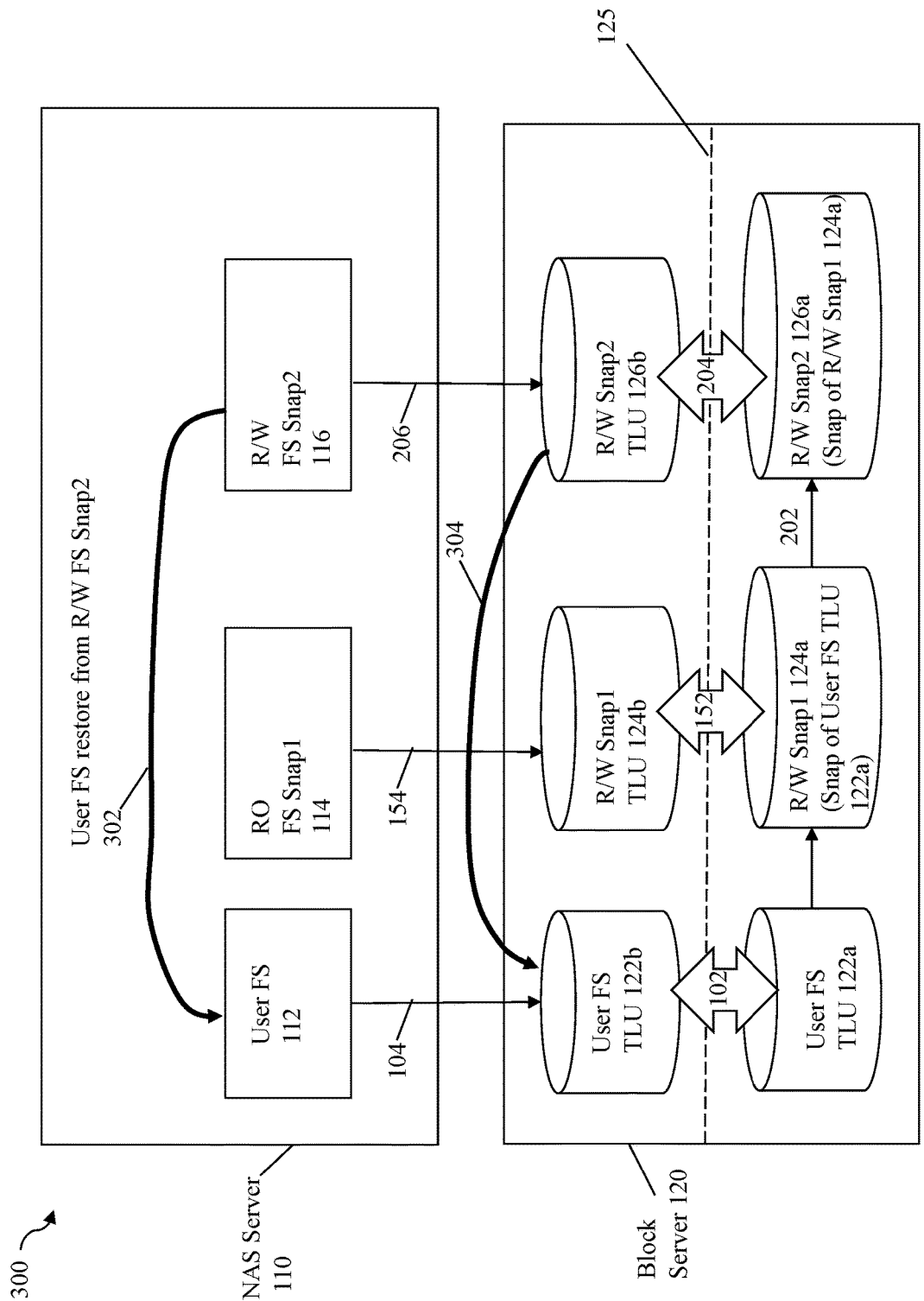

Referring to FIG. 6, once the consistency processing (including all corrections to place the file system metadata for R/W FS snap2 116 in a consistent state) performed by FSCK has completed, the primary file system, User FS 112, may be restored 302 online from the mounted checkpoint file system, R/W FS snap2 116. The arrow 302 denotes the restore command as issued on the NAS server 110 which may then result in a request to the block server 120 to perform the restoration 304 on the block-based TLUs. The arrow 304 denotes the restoration performed within the block server 110 where TLU 122b is restored from TLU 126b (e.g., 122a is restored from 124a). In this manner, a stable and consistent version of the primary file system, User FS 112, may be obtained and made available to external clients, such as hosts, after completion of the restoration operation. In at least one embodiment of the restoration operation, the User FS 112 may be made available for I/O operations from external clients as soon as the consistency processing has been completed. In such an embodiment, the restoration operation, where data from the prior point in time snapshot R/W FS snap2 116 is restored to the user FS 112, may be performed as a background operation and clients may be able to issue I/O operations and other file-based commands or operations with respect to the user FS 112 while the restoration operation is ongoing and has not yet completed. In this manner, the user FS 112 may be characterized as having an online restoration where the restoration is performed while the user FS 112 is online and available to clients that may issue file commands to the user FS 112.

It should be noted that techniques as described herein may be used to restore selected portions of the prior point in time snapshot R/W FS snap2 116 (e.g., mounted as the R/W checkpoint file system 116) to the user FS 112 rather than the complete entire prior point in time version of the user FS from 116. For example, in such an embodiment, rather than perform a complete restoration as described herein, one or more selected storage objects of the mounted as the R/W checkpoint file system 116 may be selected and copied to the user FS 112 to thereby restore only such selected storage objects from the R/W checkpoint file system 116. For example, the one or more storage objects selected may include one or more selected files, and/or one or more selected directories existing in the R/W checkpoint file system 116.

As noted above, in at least one embodiment, the restoration of the user FS 112 from the snapshot R/W FS snap2 116 (e.g., mounted as the R/W checkpoint file system 116) may be performed as an online restoration operation where clients, such as hosts, may issue commands to the user FS 112 while the restoration is ongoing. In such an embodiment, any suitable techniques may be used to facilitate the online restoration. For example, as described herein the restoration which includes restoring storage objects from 116 to 112 (e.g., such as by copying user data for the restored storage objects from 116 to 112) may be performed as a background operation or task. The restoration processing may include copying user data for a storage object of 116 and overwriting an existing version of the storage objects in 112.

Figure 7:
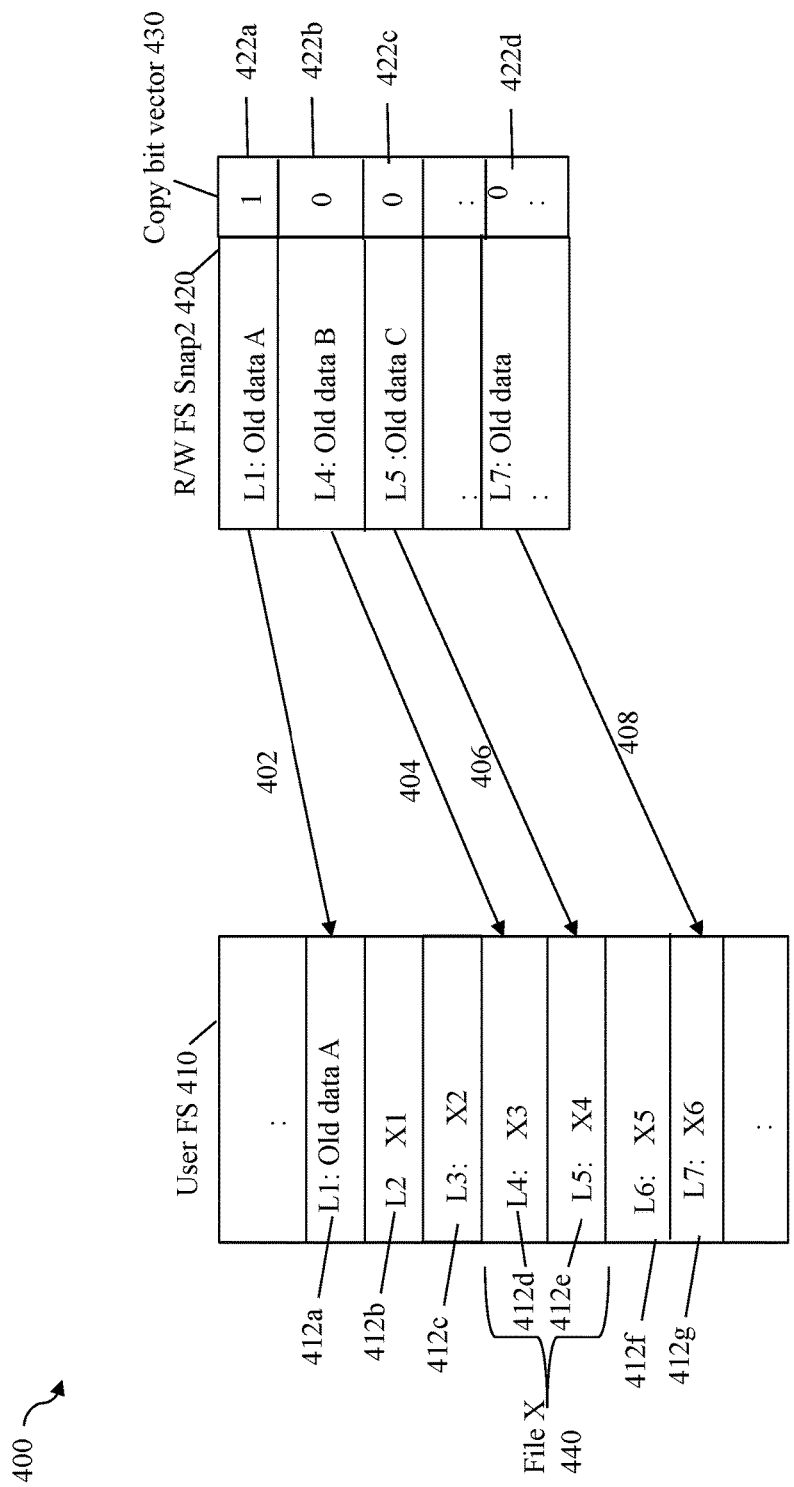

With reference to FIG. 7, shown is an example illustrating a restoration operation in an embodiment in accordance with techniques herein. The example 400 includes the user FS 410 and R/W FS Snap2 420 which are respectively similar to the user FS 112 and R/W Snap 2 116 as described above. The copy bit vector 430 may include a bit entry for each block or portion of data to be copied as part of the restoration operation from the R/W FS Snap2 420 to the user FS 410. An entry of vector 430 with a value of 0 denotes that the associated block or data portion has not been restored to the user FS 410, and a value of 1 denotes that the associated block or data portion has been restored to the user FS 410. In this example, assume all entries of the vector 430 are initialized to 0 prior to the background processing commencement of the restoration operation. Assume the background processing sequentially copies or restores the data from 420 to 410. Each entry of the list 420 includes a block or location denoted as L1, wherein "i" is a non-zero integer. Each L1 of 420 specifies a particular block or location in the user FS 410 to be restored to have the particular data of the entry. For example, entry 422a indicates that the content "Old data A" is restored to location L1 in the user FS 410. As denoted by 430, background processing has copied or restored data for only the entry 422a but not for any of the other entries of 420. As illustrated by the arrow 402, the contents of 422a has been restored to location L1 412a of the user FS 410. Assume now a file read operation is received to read data from the user FS 410 for the file X from the blocks L4 412d and L5 412e. Processing may be performed to service the read operation by first checking the information of the R/W FS Snap2 420 and vector 430 to see whether the original or old data for blocks L4 and L5 is to be restored to the user FS 410 and, if so, has such data yet been copied to the user FS 410. In this example, processing determines that the entries 422b and 422c of 420 indicate that data for the blocks L4 and L5 is to be restored and the bit vector values for 422b and 422c are 0, indicating that such data for the blocks L4 and L5 has not yet been restored from 420 to the user FS 410. As such, in one embodiment, processing may perform an on-demand read or restoration of the data for L4 422b where "Old data B" of 422b is copied 404 to 412d thereby overwriting the content "X3" of 412d, and where "Old data C" of 422c is copied 406 to 412e thereby overwriting the content "X4" of 412e. After performing the on-demand read or restoration, the bit values of the vector 430 for 422b and 422c may be updated to 1. Subsequently, the read may be serviced by providing the restored content of "Old data B" for L4, and the content of "Old data C" for L5. The foregoing is one way in which a read directed to the user FS 410 may be serviced as part of the restoration processing while the user FS 410 is online and available for clients to access.

As another example, assume a write is received to write the content "NEW" to L7 of the user FS 410. Processing may be performed to service the write operation by first checking the information of the R/W FS Snap2 420 and the vector 430 to see whether original or old data for the block L7 is to be restored to the user FS 410. In this example, processing determines that the entry 422d of 420 indicates that data for the block L7 is to be restored and the bit vector value for 422d is 0, indicating that data for block L7 has not yet been restored to the user FS 410. As such, in one embodiment, processing may overwrite the content X6 in the entry 440g for block L7 with the content "NEW" and also update the bit value in the vector 430 for the entry 422d to be 1 indicating that there is no need to further copy or restore the content of 422d to 440g. The foregoing is one way in which a write directed to the user FS 410 may be serviced as part of the restoration processing while the user FS 410 is online and available for clients to access.

The processing performed and described above provides for novel and inventive processing to restore a primary file system, such as the user FS 112, to a consistent logical point in time. The techniques as described herein may be contrasted with other processing that does not use the techniques herein. For example, in one alternative not using the techniques herein, the user FS 112 may be restored from the existing RO snapshot file system, RO FS Snap1 114. In this alternative, the user FS 112 may not be consistent and stable with respect to the file system's metadata since file system consistency checking has not been performed on 114. Furthermore, if a file system consistency checking utility, such as FSCK, is run on RO FS Snap 114, FSCK cannot directly perform any needed modifications or writes to the RO FS Snap 114 to place its file system metadata in a consistent state since it is read only.

As described herein such as with reference to FIG. 6, FSCK is one example of a utility or application that may be used to perform a file system consistency check and, if needed, repair of the file system metadata for the R/W FS Snap 2 116 mounted 206 as a R/W checkpoint file system in the NAS server 110. The following are some examples of the file system inconsistencies with respect to the file system metadata that may be checked and possibly corrected or repaired by FSCK or another suitable utility or application in order to leave the file system metadata in a consistent state prior to use in restoring the user FS 112. In at least one embodiment using a version of FSCK, FSCK may traverse all file system metadata starting with the root directory, checking inodes and directories for internal consistency, rebuilding inode and block allocation maps, and checking for overall consistency between all metadata. For example, FSCK may check for and repair inconsistencies such as unreferenced inodes, incorrect link count of inodes, missing blocks in the free list, blocks appearing in the free list and also in files, and incorrect counts in the super block. For example, FSCK may check that all the blocks marked as free are not claimed by any files.

As another example of an FSCK consistency check and repair, when a file system is created, a fixed number of inodes are set aside, but they are not allocated until needed. An allocated inode is one that points to a file. An unallocated inode does not point to a file and, therefore, should be empty. The partially allocated state means that the inode is incorrectly formatted. An inode may be in the partially allocated state, for example, if bad data is written into the inode list because of a hardware failure. Upon detecting an inode in the partially allocated state, FSCK clear the inode thereby placing the inode in the unallocated state.

FSCK may check for inconsistencies with respect to counts included in the metadata for the file system. For example, one count inconsistency determined may be finding a mismatch between the directory inode link counts and actual directory links whereby the corrective action may to update the counts as stored in the metadata to reflect the actual number of links determined by traversal of the metadata. As another example, the number of free blocks listed in a superblock and may not match the number of unallocated free blocks counted via traversal of the file system metadata. FSCK may inform a user of this mismatch and then update the count of the superblock count to match the actual number of unallocated free blocks counted.

The foregoing are merely some examples of file system inconsistencies that may be checked, and for which a corrective action may be taken, by FSCK or another suitable utility to thereby leave a file system and its metadata in a consistent state.

Figure 8:
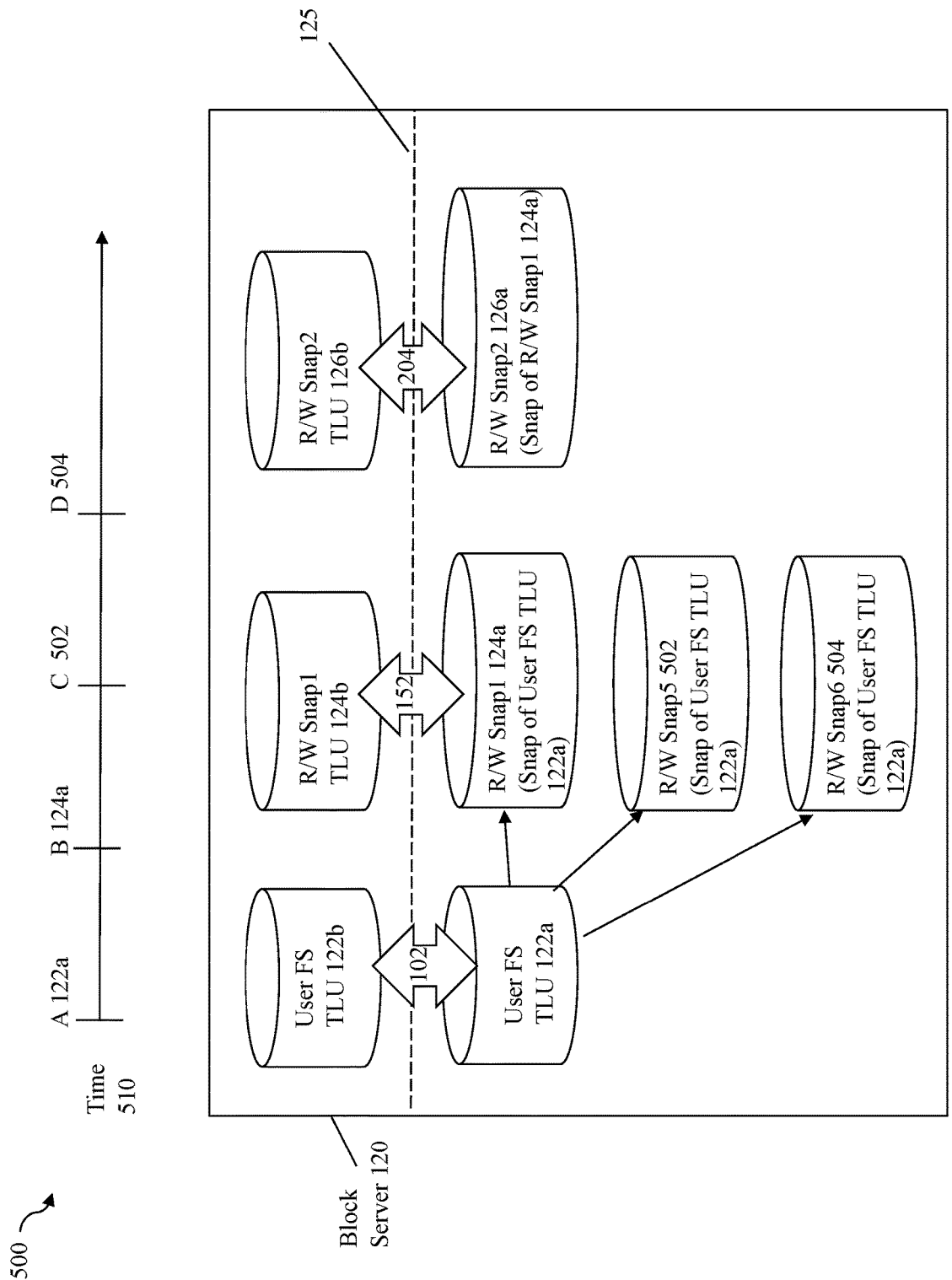

Referring to FIG. 8, shown is an example illustrating use of a snapshot schedule and associated snapshots that may be used in an embodiment in accordance with the techniques herein. The example 500 includes a timeline 510 denoting points in time A, B, C and D. At the point in time A, the original user FS TLU 122b may be created, such as based on commands issued through the NAS server to create the file system user FS 112. Subsequent points in time B, C and D are points in time subsequent to A at which block-based snapshots of the user FS TLU 122a may be taken. For example, B, C, and D may denote the points in time at which snapshots of the user FS TLU 122a are taken based on a defined schedule, such as a periodic schedule (e.g., every day, every 4 hours, and the like). In the example 500, the block server 120 and the components thereof may be as described in connection with other figures herein and below.

In the example 500, the block server 120 is illustrated as including the 3 snapshots 124a, 502 and 504. The snapshot 124a is a first block-based snapshot of the user FS TLU 122a taken at the point in time B. The snapshot 502 is a second block-based snapshot of the user FS TLU 122a taken at the point in time C. The snapshot 504 is a third block-based snapshot of the user FS TLU 122a taken at the point in time D. A user may be presented with the information of the timeline 510 denoting the points in time A-D as illustrated whereby the points B, C and D are denoted as points in time at which snapshots have been taken of the user FS TLU 122a. The user may be prompted to then select one of the points in time B, C and D where the user FS 112 is restored from the particular snapshot taken at the selected point in time. For example, the user may select point in time B. In response to selecting B, processing as described herein may be performed to take the snapshot 126a of the selected snapshot 124a; link or bind the snapshot 126a to the target device R/W Snap2 TLU 126b, and mount (206 of FIG. 6) the target device R/W Snap2 TLU 126b as the checkpoint file system, R/W FS Snap2 116.

In this manner as illustrated by the example 500, a user may select one snapshot from possibly multiple existing snapshots where the user FS 112 is restored to the selected snapshot in accordance with techniques described herein. In at least one embodiment, the block-based snapshots 502 and 504 as illustrated in FIG. 8 may be characterized as targetless snapshots in that they are not linked to a target device (e.g., not exposed or exported out of the block server 120 and thus have no associated identity above line 125). When the restoration of the user FS 112 to the selected snapshot 124a is complete, the snapshot 124a may be unlinked or unbound from the target device, R/W snap1 TLU 124b, thereby causing the snapshot 124a to transition to the state of a targetless snapshot. In a similar manner, a user may select any of the other snapshots 502 and 504 rather than snapshot 124a, whereby processing as described herein for the snapshot 124a may be similarly performed for the other selected snapshot of either 502 or 504.

Figure 9:
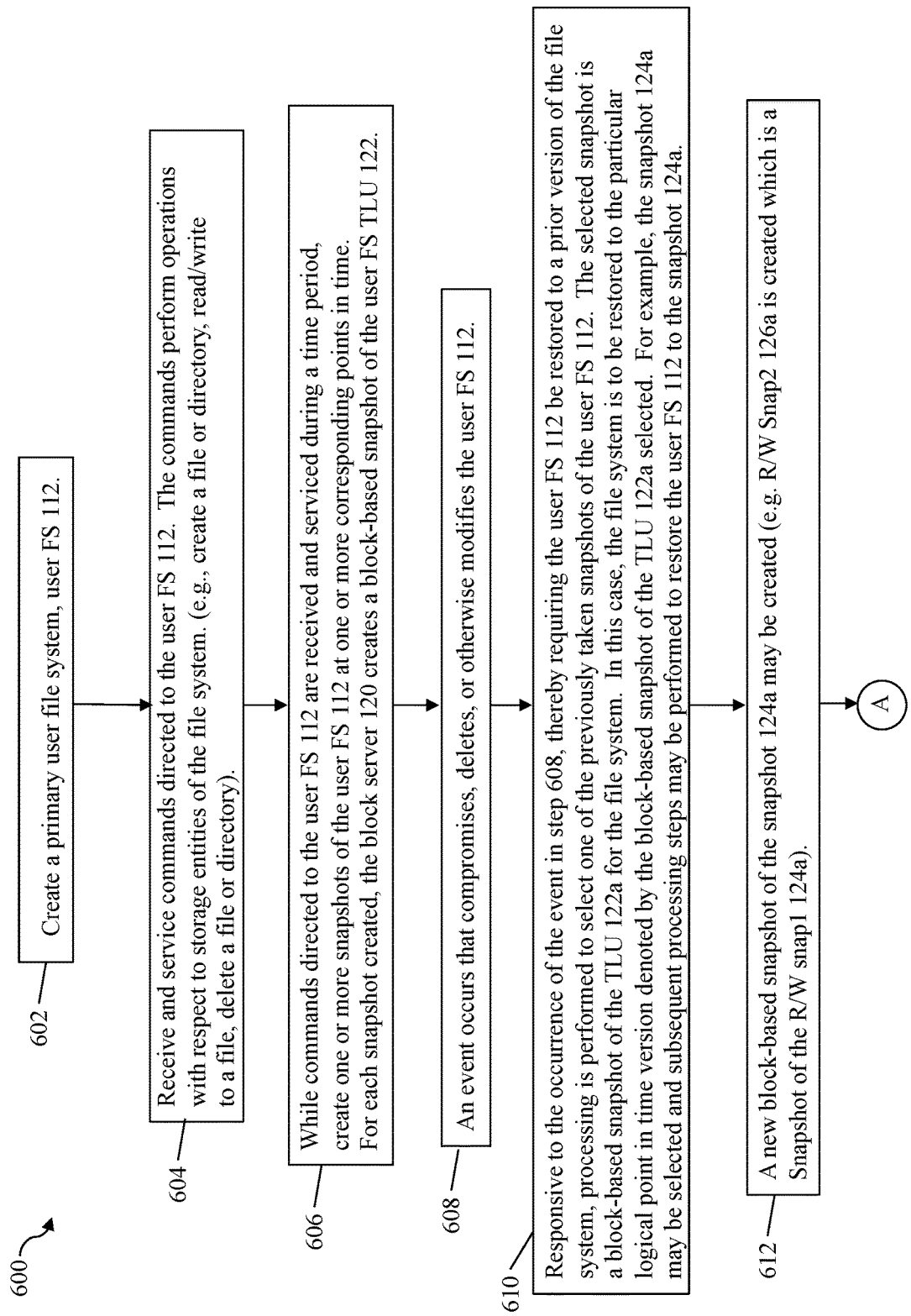
FIGS. 9 and 10 are flowcharts of processing steps that may be performed in an embodiment in accordance with the techniques herein.
Figure 10:
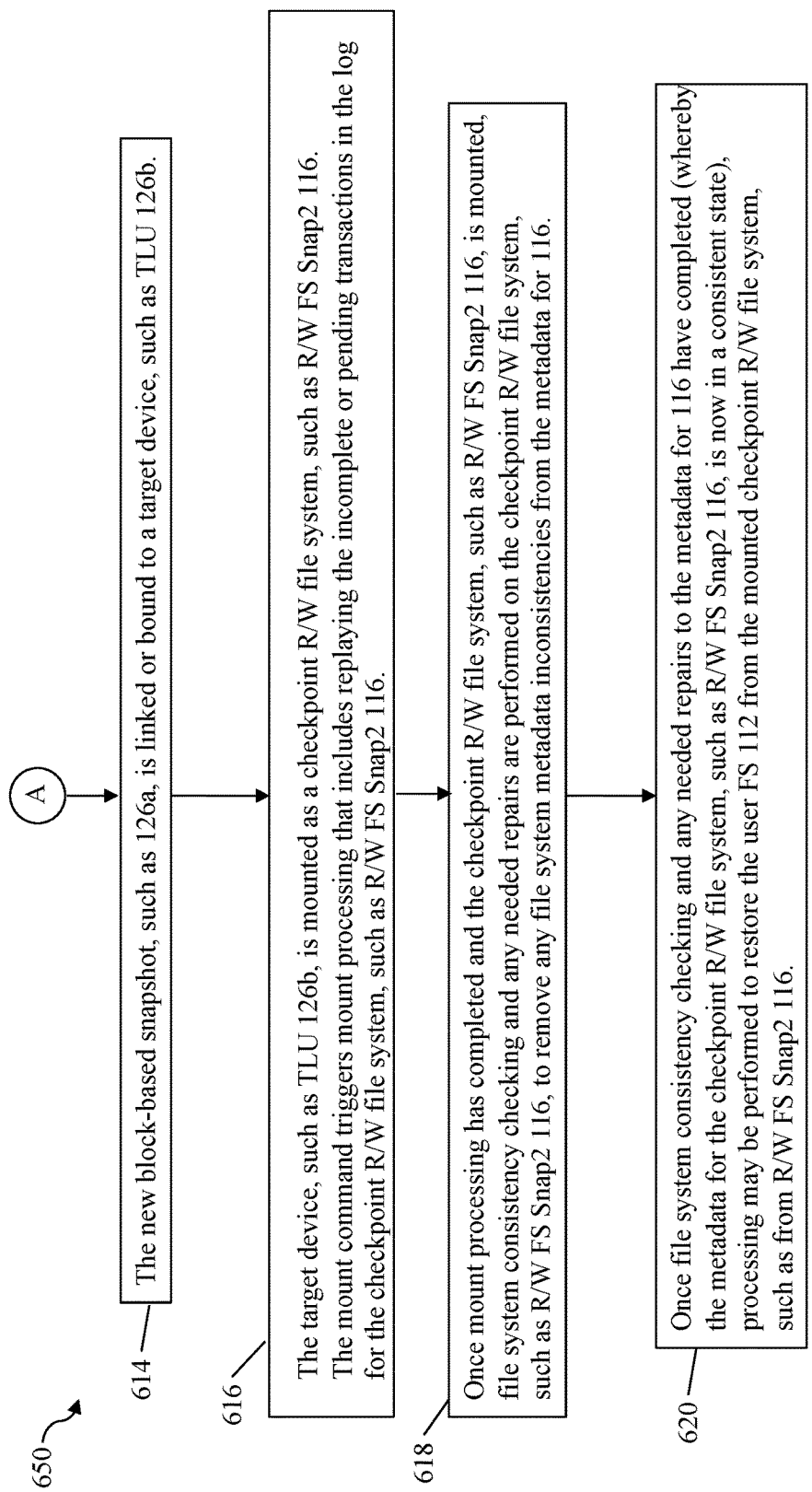

Referring to the FIGS. 9 and 10, shown are flowcharts of processing steps that may be performed in an embodiment in accordance with techniques herein. The flowcharts 600 and 650 summarize the processing as described above that may be performed in an embodiment in accordance with techniques herein.

At the step 602, a primary user file system, such as the user FS 112, is created. From step 602, control proceeds to the step 604. At the step 604, processing is performed to receive and service commands directed to the user FS 112. The commands perform operations with respect to storage entities of the file system. (e.g., create a file or directory, read/write to a file, delete a file or directory). From the step 604, control proceeds to the step 606. At the step 606, while the commands directed to the user FS 112 are received and serviced during a time period, processing is performed to create one or more snapshots of the user FS 112 at one or more corresponding points in time. For each snapshot created in step 606, the block server 120 creates a block-based snapshot of the user FS TLU 122. From the step 606, control proceeds to the step 608. At the step 608, an event occurs that compromises, deletes, or otherwise modifies the user FS 112. From the step 608, control proceeds to the step 610. At the step 610, responsive to the occurrence of the event in step 608, thereby requiring the user FS 112 be restored to a prior version of the filesystem, processing is performed to select one of the previously taken snapshots of the user FS 112. The selected snapshot is a block-based snapshot of the TLU 122a for the file system. In this case, the file system is to be restored to the particular logical point in time version denoted by the block-based snapshot of the TLU 122a selected. For example, the snapshot 124a may be selected and subsequent processing steps may be performed to restore the user FS 112 to the snapshot 124a.

From the step 610, control proceeds to the step 612. At the step 612, processing is performed to create a new block-based snapshot of the snapshot 124a may be created (e.g. R/W Snap2 126a is created which is a Snapshot of the R/W snap1 124a). From the step 612, control proceeds to the step 614. At the step 614, the new block-based snapshot, such as 126a, is linked or bound to a target device, such as TLU 126b. From the step 614, control proceeds to step 616. At the step 616, the target device, such as TLU 126b, is mounted as a checkpoint R/W file system, such as R/W FS Snap2 116. The mount command triggers mount processing that includes replaying the incomplete or pending transactions in the log for the checkpoint R/W file system, such as R/W FS Snap2 116. From the step 616, control proceeds to the step 618. At the step 618, once mount processing has completed and the checkpoint R/W file system, such as R/W FS Snap2 116, is mounted, file system consistency checking and any needed repairs are performed on the checkpoint R/W file system, such as R/W FS Snap2 116, to remove any file system metadata inconsistencies from the metadata for 116. From the step 618, control proceeds to step 620. At the step 620, once the file system consistency checking and any needed repairs to the metadata for 116 have completed (whereby the metadata for the checkpoint R/W file system, such as R/W FS Snap2 116, is now in a consistent state), processing may be performed to restore the user FS 112 from the mounted checkpoint R/W file system, such as from R/W FS Snap2 116.

The techniques herein may be performed using any suitable hardware and/or software. For example, the techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of performing a file system restoration comprising:
   creating a first snapshot of a primary file system at a first point in time, wherein the first snapshot of the primary file system is a read-write snapshot created on an associated logical device used internally within a block server, wherein the associated logical device used internally within the block server is exported as an associated target device that is mounted as a read-only checkpoint file system denoting a logical version of the primary file system at the first point in time; and
   at a second point in time subsequent to the first point in time, performing first processing to restore at least a portion of the primary file system from the first point in time, said first processing including:
      creating a second snapshot of the first snapshot of the primary file system at the first point in time;
      exporting the second snapshot as a first target device;
      mounting the first target device as a read-write checkpoint file system that denotes a logical version of the primary file system at the first point in time;
      performing file system consistency processing that corrects metadata inconsistencies of the read-write checkpoint file system corresponding to the second snapshot of the first snapshot of the primary file system; and
      subsequent to performing the file system consistency processing that corrects metadata inconsistencies of the read-write checkpoint file system, restoring at least a portion of the primary file system from the second snapshot using the read-write checkpoint file system, wherein said restoring is an online restoration operation where a client issues I/O operations to the primary file system while said restoring is ongoing and not yet completed.

2. The method of claim 1, wherein the primary file system is created on a first logical device used within the block server, the first logical device is exported as a second target device, and the second target device is mounted as the primary file system on a file server.

3. The method of claim 2, wherein creating the first snapshot of the primary file system includes:
   creating a first block-based read-write snapshot of the first logical device on the block server.

4. The method of claim 3, wherein the second snapshot is a second block-based snapshot, and wherein creating the second snapshot of the primary file system includes:
   creating the second block-based snapshot of the first block-based snapshot of the first logical device on the block server; and
   exporting the second block-based snapshot as the first target device.

5. The method of claim 1, wherein said performing file system consistency processing includes modifying metadata of the second snapshot to correct a detected metadata inconsistency.

6. The method of claim 1, wherein said restoring at least the portion of the primary file system from the second snapshot using the read-write checkpoint file system includes copying any of a file and a directory from the primary file system as at the first point in time from the read-write checkpoint file system to the primary file system.

7. The method of claim 1, wherein said restoring at least the portion of the primary file system from the second snapshot using the read-write checkpoint file system includes restoring, from the read-write checkpoint file system, the primary file system to a version corresponding to the first point in time.

8. The method of claim 7, wherein said restoring at least the portion of the primary file system is performed as a background operation while servicing file-based commands and operations directed to the primary file system.

9. The method of claim 1, wherein the first processing performed at a second point in time subsequent to the first point in time to restore at least a portion of the primary file system from the first point in time is performed responsive to determining that at least a portion of the primary file system at the second point in time has been any of corrupted, compromised, deleted or modified.

10. The method of claim 1, wherein said mounting the first target device as a read-write checkpoint file system that denotes a logical version of the primary file system at the first point in time includes replaying and applying to the read-write checkpoint file system any incomplete subtransactions of pending transactions in a transaction log for the read-write checkpoint file system.

11. A system comprising:
   at least one processor; and
   a memory comprising code stored thereon that, when executed, performs a file system restoration comprising:
      creating a first snapshot of a primary file system at a first point in time, wherein the first snapshot of the primary file system is a read-write snapshot created on an associated logical device used internally within a block server, wherein the associated logical device used internally within the block server is exported as an associated target device that is mounted as a read-only checkpoint file system denoting a logical version of the primary file system at the first point in time; and
      at a second point in time subsequent to the first point in time, performing first processing to restore at least a portion of the primary file system from the first point in time, said first processing including:
         creating a second snapshot of the first snapshot of the primary file system at the first point in time;
         exporting the second snapshot as a first target device;
         mounting the first target device as a read-write checkpoint file system that denotes a logical version of the primary file system at the first point in time;
         performing file system consistency processing that corrects metadata inconsistencies of the read-write checkpoint file system corresponding to the second snapshot of the first snapshot of the primary file system; and
         subsequent to performing the file system consistency processing that corrects metadata inconsistencies of the read-write checkpoint file system, restoring at least a portion of the primary file system from the second snapshot using the read-write checkpoint file system, wherein said restoring is an online restoration operation where a client issues I/O operations to the primary file system while said restoring is ongoing and not yet completed.

12. A non-transitory computer readable medium comprising code stored thereon that, when executed, performs a file system restoration comprising:
creating a first snapshot of a primary file system at a first point in time, wherein the first snapshot of the primary file system is a read-write snapshot created on an associated logical device used internally within a block server, wherein the associated logical device used internally within the block server is exported as an associated target device that is mounted as a read-only checkpoint file system denoting a logical version of the primary file system at the first point in time; and
at a second point in time subsequent to the first point in time, performing first processing to restore at least a portion of the primary file system from the first point in time, said first processing including:
creating a second snapshot of the first snapshot of the primary file system at the first point in time;
exporting the second snapshot as a first target device;
mounting the first target device as a read-write checkpoint file system that denotes a logical version of the primary file system at the first point in time;
performing file system consistency processing that corrects metadata inconsistencies of the read-write checkpoint file system corresponding to the second snapshot of the first snapshot of the primary file system; and
subsequent to performing the file system consistency processing that corrects metadata inconsistencies of the read-write checkpoint file system, restoring at least a portion of the primary file system from the second snapshot using the read-write checkpoint file system, wherein said restoring is an online restoration operation where a client issues I/O operations to the primary file system while said restoring is ongoing and not yet completed.

13. The non-transitory computer readable medium of claim 12, wherein the primary file system is created on a first logical device used within the block server, the first logical device is exported as a second target device, and the second target device is mounted as the primary file system on a file server.

14. The non-transitory computer readable medium of claim 13, wherein creating the first snapshot of the primary file system includes:
creating a first block-based read-write snapshot of the first logical device on the block server.

15. The non-transitory computer readable medium of claim 14, wherein the second snapshot is a second block-based snapshot, and wherein creating the second snapshot of the primary file system includes:
creating the second block-based snapshot of the first block-based snapshot of the first logical device on the block server; and
exporting the second block-based snapshot as the first target device.

16. The non-transitory computer readable medium of claim 12, wherein said performing file system consistency processing includes modifying metadata of the second snapshot to correct a detected metadata inconsistency.

17. The non-transitory computer readable medium of claim 12, wherein said restoring at least the portion of the primary file system from the second snapshot using the read-write checkpoint file system includes copying any of a file and a directory from the primary file system as at the first point in time from the read-write checkpoint file system to the primary file system.

18. The non-transitory computer readable medium of claim 12, wherein said restoring at least the portion of the primary file system from the second snapshot using the read-write checkpoint file system includes restoring, from the read-write checkpoint file system, the primary file system to a version corresponding to the first point in time.

19. The non-transitory computer readable medium of claim 18, wherein said restoring at least the portion of the primary file system is performed as a background operation while servicing file-based commands and operations directed to the primary file system.

* * * * *